G. S. GRIGGS.
Car Brake.
No. 1,452.  Patented Dec. 31, 1839.
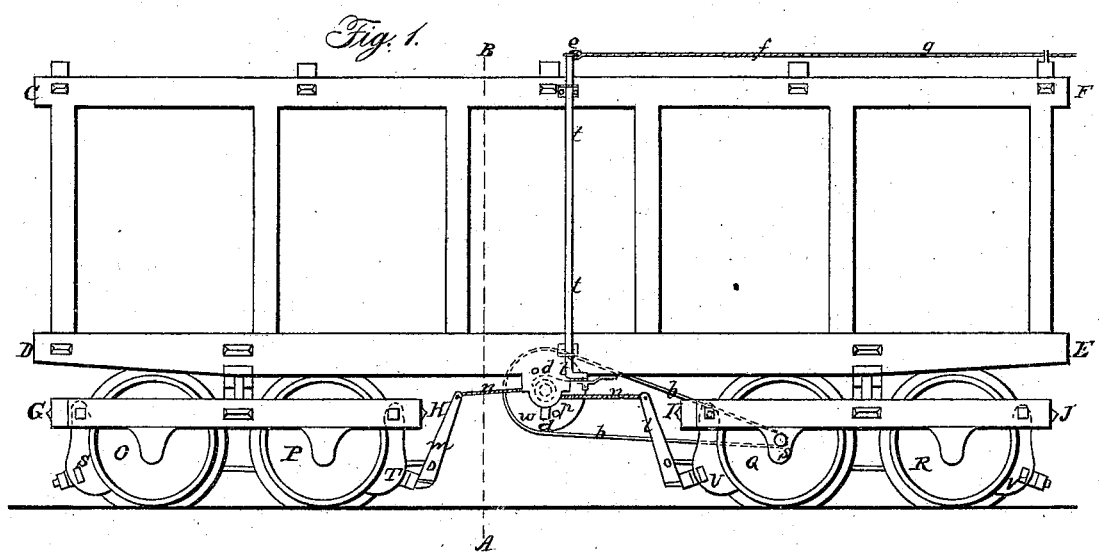
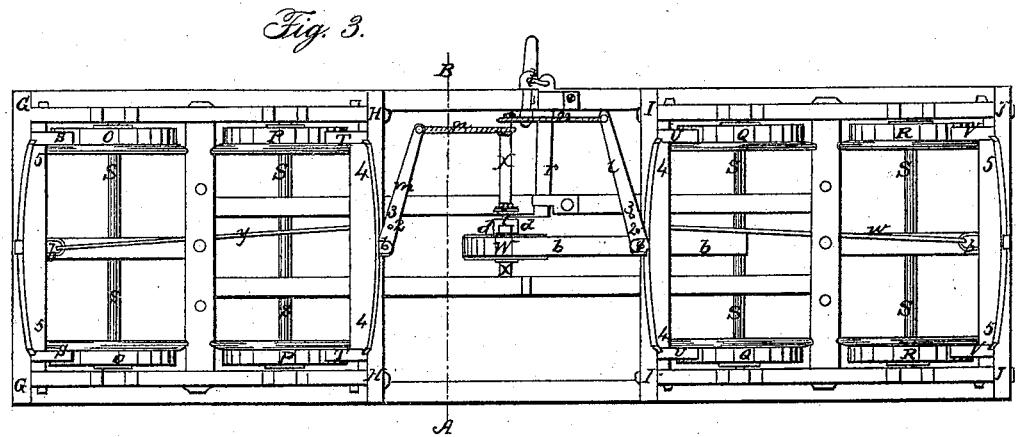
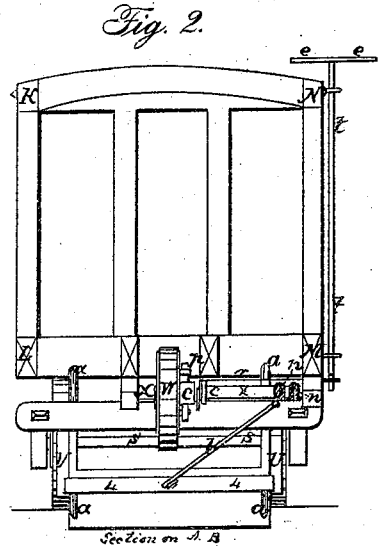
Witnesses:
Rich Robins
Willard Phillips
Dav. Treadwell
Inventor:
George S. Griggs

UNITED STATES PATENT OFFICE.

GEORGE S. GRIGGS, OF ROXBURY, MASSACHUSETTS.

SELF-ACTING SAFETY-BRAKE FOR RAILROAD-CARS.

Specification of Letters Patent No. 1,452, dated December 31, 1839.

*To all whom it may concern:*

Be it known that I, the undersigned, GEORGE S. GRIGGS, of Roxbury, in the county of Norfolk, in the State of Massachusetts, engineer, and a native citizen of the United States of America, have invented a new and useful Improvement in Brakes for Railroad-Cars, which I call my "Self-Acting Safety-Brake," of which the following is a true and full description, viz:

I have a shaft or axle (X Figures 2, 3 in the annexed drawing) supported in boxes or bearings in the bottom frame, or in fixtures connected with or attached to the bottom frame of the car. On this shaft or axle is a loose pulley (W, Figs. 1, 2, 3) capable of being put into gear or out of gear with the shaft (X, Figs. 2, 3). This loose pulley is driven by a band (b, Figs. 1, 3) passing also over a fixed pulley upon the shaft or axle (s, s) of the car-wheels (Q, Figs. 1, 3) or over the shaft itself. A chain or rope, or connecting gear, consisting partly of a rod and partly of a chain or rope (n, Figs. 1, 3) is attached at one end to the shaft (X, Figs. 2, 3) on which is the loose pulley (W, Figs. 1, 2, 3), the rope or chain being so attached that it may be wound around that shaft or axis or around a pulley fixed to it. This shaft or axis is made to revolve by the loose pulley (W, Figs. 1, 2, 3), being put in gear with it by means of a clutch. The other end of this connecting gear (n, Figs. 1, 3) is attached to a lever (l, Figs. 1, 2, 3) and if the car be double, as it is represented to be in the drawing, and the self-acting brake is applied to both sets of wheels another connecting rope or chain (n, Figs. 1, 3) is attached to another similar lever (m, Figs. 1, 3), which levers move each on a pivot (1, Fig. 3), fixed in the crosspiece or connecting beam (4, 4, Figs. 2, 3) of the lower ends of the brakes (U, U, Figs. 1, 2, 3, on one side and T, T, Figs. 1, 3, on the other side), the brakes being constructed and adjusted in the usual manner. In the annexed drawings the pivots of the levers (l, m, Figs. 1, 3) are supported by a fixture standing on the crosspieces (4, 4, Figs. 2 and 3), but the manner of supporting or adjusting the pivot may be varied, as will be obvious. The crosspieces or connecting beams (5, 5, Fig. 3) at the lower ends of the brakes (S, S, and V, V, Figs. 2 and 3) have each a staple (6), to which is connected a rod (w on one side and y on the other), the opposite ends of which rods hook into holes (2) for the levers (l on one side and m on the other). The drawings show two holes (2 and 3) in the levers by which the rods (w and y) take hold of these levers, and the number of holes in each may be increased, the object being to change the leverage if desirable, as will be obvious.

It is evident that by revolving the shaft or axis (X, Figs. 2, 3) and winding the rope or chain or ropes or chains (n, Figs. 1, 3) around it the brakes (S, T, U, V, Figs. 1, 2 and 3) will bear upon their respective wheels and very soon cause sufficient friction to stop their revolutions and cause them to slide on the rails until the train is stopped. To cause this shaft (X, Figs. 2 and 3) to revolve, the loose pulley (W, Figs. 1, 2, 3) is clutched by the clutch (c, c, Figs. 2 and 3), the dogs of which (d, d) take hold upon pins (P, Figs. 1, 3) standing out horizontally from the loose pulley W. The clutch may be constructed in a variety of ways, the particular form of it not being material. The clutch is clutched and unclutched by sliding it on its shaft by means of a rod (r, Figs. 2 and 3) which takes hold of the clutch (c, c, Figs. 2 and 3) by means of a fork, but might take hold otherwise, the different modes of taking hold being a matter of familiar practice in mechanics. The clutch rod (r, Figs. 2 and 3) and so the clutch c, c, is governed and operated by a perpendicular rod (t, Figs. 1 and 3,) having an elbow at the lower end, as shown in the drawing (Fig. 1). The top of this perpendicular rod (e, Figs. 1 and 2) standing just above the top of the cars is in the form of a T, having a line attached to each of the arms, by pulling one of which lines the rod is revolved partly in one direction to draw out the horizontal clutch rod (r, Figs. 2 and 3) and thus the clutch is unclutched and the pulley (W, Figs. 1 and 2) is loosened and by drawing the other it is clutched and the shaft is made to revolve with that pulley and the brakes to bear and stop the train. The lines attached to the T may be carried to any part of the train, so that the engineer or any other person on any part of the train may govern the brakes and stop the train at any time.

The advantages of this apparatus are that the expense of brakemen may be saved and the cars may be checked as soon as the engineer or any person forward sees danger, and the apparatus is much more effectual for this purpose than brakemen, and the danger arising from the brakemen jumping off, as they sometimes do, is avoided and the train is stopped much more suddenly than by brakemen, and without any shock or strain, and in case of some cars of the train breaking loose, as they sometimes do, the lines may be so adjusted that the line for stopping the loose cars will, by the very circumstance of their breaking loose be drawn until they are parted and the loose cars thus stopped instead of drifting along the railway, as they sometimes have done, to the great jeopardy of passengers. When the motion of the train is merely to be checked, but the train not stopped, the brakes of one or two cars, or more, that is as many as may be sufficient for the purpose, may be made to bear upon the wheels, the stopping of which and their sliding on the rails may be sufficient to check the speed as much as may be desired.

I claim as my invention and the subject of a patent—

The causing of the revolution of the wheels to operate the brakes of railroad cars in the manner and by the mechanical contrivance above described, or in any manner or by any mechanical contrivance substantially the same and varying therefrom only in form, for the construction, as will be evident to any mechanic conversant with the subject, may be varied in its mere form very much without any invention, or the introduction of any new principle.

In witness whereof I, the said GEORGE S. GRIGGS, hereto subscribe my name in the presence of the witnesses whose names are hereto subscribed on the fifth day of December, A. D. 1839.

GEORGE S. GRIGGS.

Witnesses:
DANL. TREADWELL,
WILLARD PHILLIPS.